United States Patent
Cordery et al.

(10) Patent No.: US 6,295,359 B1
(45) Date of Patent: Sep. 25, 2001

(54) METHOD AND APPARATUS FOR DISTRIBUTING KEYS TO SECURE DEVICES SUCH AS A POSTAGE METER

(75) Inventors: Robert A. Cordery, Danbury; Frederick W. Ryan, Jr., Oxford; Ari P. Singer, Hamden, all of CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/082,698

(22) Filed: May 21, 1998

(51) Int. Cl.⁷ ............................................. H04L 9/00
(52) U.S. Cl. ........................ 380/44; 380/30; 713/176
(58) Field of Search .............................. 713/157, 165, 713/176, 177, 180; 380/44, 286, 28, 30

(56) References Cited

U.S. PATENT DOCUMENTS

| | | | |
|---|---|---|---|
| 4,752,950 | 6/1988 | Le Carpentier | 379/106 |
| 5,375,169 | 12/1994 | Seheidt et al. | 380/21 |
| 5,610,982 | * 3/1997 | Micali | 713/157 |
| 5,666,414 | * 9/1997 | Micali | 380/286 |
| 5,901,227 | * 5/1999 | Perlman | 713/157 |
| 5,991,414 | * 11/1999 | Garay et al. | 713/165 |
| 6,032,138 | * 2/2000 | McFiggans et al. | 705/410 |
| 6,075,862 | * 6/2000 | Yoshida et al. | 380/28 |
| 6,128,391 | * 10/2000 | Denno et al. | 380/283 |

FOREIGN PATENT DOCUMENTS

| | | | |
|---|---|---|---|
| 0 292 790 A2 | 5/1988 | (EP) | H04L/9/00 |
| WO 94/13081 | 6/1994 | (WO) | H04L/9/18 |
| WO 99/16031 | 4/1999 | (WO) | G07F/7/10 |

OTHER PUBLICATIONS

XP–002137735 –USPS—Information Based Indicia Program (IBIP) Indicium Specification Dated Jun. 13, 1996.

* cited by examiner

Primary Examiner—Thomas R. Peeso
Assistant Examiner—Stephen Kabakoff
(74) Attorney, Agent, or Firm—Steven J. Shapiro; Michael E. Melton

(57) ABSTRACT

A method for assigning keys to a plurality of devices in a public key cryptographic system includes generating a set of more than one master private keys; calculating for each master private key a corresponding master public key; installing in each of the plurality of devices a corresponding device private key derived as a linear combination of at least two of the master private keys from the set of master private keys whereby knowledge of the corresponding device private key installed in any one of the plurality of devices is not sufficient to determine the corresponding device private key of any other of the plurality of devices. A device public key can be calculated as a corresponding combination of the master public keys.

13 Claims, 3 Drawing Sheets

METHOD AND APPARATUS FOR DISTRIBUTING KEYS TO SECURE DEVICES SUCH AS A POSTAGE METER

BACKGROUND OF THE INVENTION

This invention relates to an apparatus and method for distributing keys in a cryptographic system and more particularly to an apparatus and method for distributing keys in a public key system utilized in a postage metering environment.

Digital printing technology has enabled mailers to implement digital, i.e. bit map addressable, printing for the purpose of evidencing payment of postage. Advances in digital printing technology have made it possible to print on a mailpiece a postage indicium that is unique to the mailpiece. The indicium is unique because it includes information relating directly to the mailpiece, for example, postage value, date, piece count, origin postal code and/or destination postal code (referred to herein as indicium information or indicium data). However, from the Postal Service's perspective, it will be appreciated that the digital printing and scanning technology make it fairly easy to counterfeit a postal value bearing indicium since any suitable computer and printer may be used to generate multiple copies of an image once generated.

In order to validate an indicium printed on a mailpiece, that is to ensure that accounting for the postage amount printed on a mailpiece has been properly done, it is known to include as part of the indicium encrypted information such that, for instance, the value of the postage may be verified from the encrypted information. The encrypted information is created through the use of a secret (private) key stored in the postage meter. The encrypted information is then used at a verifying site together with the secret key (secret key system) or alternatively with a corresponding public key (public key system) to verify the authenticity of the printed indicium.

Regardless of whether a public or secret key system is utilized, one of the main security concerns is the protection of the secret or private keys. If the cryptographic keys are not generated, disseminated, stored, used, and ultimately destroyed in a secure manner, then the security afforded by the cryptographic algorithms in use cannot be guaranteed. Thus, if a private key is compromised, all of the secure devices that utilize that private key are compromised. Accordingly, key management is an essential component of the overall security of any cryptographic system.

The United States Postal Service (USPS) has proposed two different public key distribution systems for information-based postage metering. The Information-Based Indicia Program (IBIP) Key Management Plan (Draft of Apr. 25, 1997) calls for a system with a live database in which each postage meter creates a random unique private key. This is a very secure system, but requires a significant certificate authority infrastructure to support authenticated key distribution from the postage meter to the mail piece indicia verifiers. On-the-other-hand, the USPS Closed Postage Payment System (CPPS) Key Management Plan (Draft of Feb. 13, 1998), calls for the postage meter provider to generate and distribute a set of public and private keys indexed by a group key number. In this scenario, many postage meters share the same group key. The weakness of this system is that if a postage meter is lost or stolen, then the Postal Service must assume that an attacker has compromised the corresponding group's private key. Therefore, the provider must recover and rekey all postage meters in the group. In both of the aforementioned systems, the postage meter is designed to be tamper resistant, as defined in the U.S. government standard FIPS pub 140-1. The design of secure postage meters makes the problem of obtaining a key from a postage meter difficult, although it is never insurmountable.

In CPPS, the assignment of a large group of postage meters to a common group key number reduces the complexity of the infrastructure as compared to the IBIP system, at the cost of reduced security. That is, the verifier need only know the small set of group public keys because the indicium contains the group key number. The verifier recovers the group key number from the specific indicia and looks up the corresponding group public key. The verifier can then check the authenticity of the signature of the indicia, which signature is based on the postage meter private key. However, the physical security of every postage meter in a key group is the only assurance that a group private key is only used to provide valid evidence of postage paid. If an attacker compromises a postage meter, then she can imitate any other postage meter in the same group. In a given year about one percent of postage meters are lost due to causes including theft, mailer moved, mailer's company closes, or simple misplacement. If a key group contains one thousand postage meters, then on the average ten of these may be missing during a given year. The postage meter group will therefore need rekeying an average of ten times per year.

In IBIP, the postage meter generates its private key using an internal random number generator to seed a key generation algorithm. The postage meter then calculates the public key and sends it to the IBIP infrastructure. The IBIP certificate authority signs a certificate with the postage meter number, postage meter license number, postage meter public key, and other data. The IBIP infrastructure returns the certificate to the postage meter, which then activates the public key. The USPS must distribute this public key certificate to verifiers to allow indicia verification. Many postage meters are introduced into service and many other postage meters are removed from service every day. The distribution of an up-to-date set of public keys to verifiers is a challenging problem. However, the system has the significant advantage that if an attacker breaks into one postage meter, he does not gain any knowledge that allows him to imitate another postage meter.

It is therefore apparent from the above that what is needed is a key generation and distribution system which provides increased security over the proposed CPPS and at the same time requires less infrastructure to manage as compared to the proposed IBIP.

SUMMARY OF THE INVENTION

It is an object of the invention to provide a method for distributing keys in a cryptographic system which overcomes the disadvantages of the proposed systems discussed above.

The above object is met by method for assigning keys to a plurality of devices in a public key cryptographic system including the steps of:
  a) generating a set of more than one master private keys;
  b) calculating for each master private key a corresponding master public key;
  c) installing in each of the plurality of devices a corresponding device private key derived as a linear combination of at least two of the master private keys from the set of master private keys whereby knowledge of the corresponding device private key installed in any one of the plurality of devices is not sufficient to determine the corresponding device private key of any other of the plurality of devices.

In a further embodiment of the invention a set of more than one master public keys is generated as a combination of the set of master private keys and a public key for each of the plurality of devices is calculated as a corresponding combination of master public keys.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

Figures 1, 2:
FIG. 1 shows a matrix of coefficients for a plurality of postage meters and master private keys.
FIG. 2 shows a calculation table for calculating the private postage meter keys for each of the postage meters of FIG. 1.

Many common public-key cryptographic algorithms for signing messages are based on operations on an algebraic structure called a finite group. A finite group consists of a set of elements "G" and an addition operation, denoted "+", for combining two elements a and b in G to obtain an element "a+b" in G. There is an identity element 0 that satisfies the equation a+0=0+a=a for every a in G, and every element a has a negative, denoted "−a", that satisfies a+−a=−a+a=0. Addition is associative, so that (a+b)+c=a+(b+c) for all a, b, and c in G. Usually, although not necessarily, addition is commutative so that a+b=b+a. If n is a positive integer, then n·b is the group element found by adding b to itself n times. For any element P in a finite group, some positive integer multiple P is 0. The smallest positive integer n such that n·P=0 is the order of P, denoted "order(P)".

In some cases, especially where the finite group is based on integer modular multiplication, matrix multiplication or if the finite group is not commutative, the finite group operation is represented as multiplication "·" and multiplication of an element b by an integer n is replaced by exponentiation, $b^n$. Although the notation is different, the mathematical analysis is unchanged.

The security of many, in fact most, common public-key cryptographic systems for signing messages are based on the difficulty of the discrete logarithm problem on a finite group. The discrete logarithm problem is given b in G and n·b, find n. In some large groups this is a difficult problem. The Digital Signature Algorithm (DSA) and the Elliptic Curve Digital Signature Algorithm (ECDSA) are frequently used examples of signature algorithms dependent on the discrete logarithm problem on some finite group. The common public information includes the finite group G and an element P in G. The private key of a postage meter M is a random integer m, and the public key is the element m·P in G.

In the IBIP, each postage meter M securely generates a random integer $m_M$ and stores $m_M$ as its private key. The postage meter calculates its public key $Q_M = m_M \cdot P$ and communicates it to the IBIP infrastructure. In CPPS, the provider securely generates a random integer $m_{gkn}$ as a private key associated with each group key number gkn. The provider securely stores these private keys for distribution to postage meters. Each postage meter receives a group key number and the corresponding private key. The provider calculates the set of public keys $Q_{gkn} = m_{gkn} \cdot P$, and distributes them to the Postal Service for use in verifying indicia.

The inventive Many-to-Many Key Management System (MMKMS) provides the same advantages of simplified key distribution as CPPS. However, the security provided by the inventive MMKMS is significantly higher than CPPS, although not as high as the IBIP system. MMKMS is therefore an effective compromise between the need for simple key distribution and sufficient security. In MMKMS, an attacker must compromise many postage meters before gaining information that helps defeat any other postage meter. This makes attacking the MMKMS by breaking into postage meters impractical.

In MMKMS, the provider generates a set of random integers $m_n$ as master private keys. The subscript n represents an index for the master public and private keys. The subscript n may be, for example, a positive integer. The provider calculates and publishes the corresponding master public keys $Q_n = m_n \cdot P$ in a form so that verifiers can find $Q_n$ given the index n. The private key $k_M$ for postage meter M is a linear combination of the private master keys: $k_M = \Sigma A_{M,n} \cdot m_n$, where $\Sigma$ denotes summation over the index n. The corresponding public key is given by a similar linear combination of the master public keys: $q_M = \Sigma A_{M,n} \cdot Q_n$ where the addition operations are operations in the group, and multiplication by the matrix elements represents repeated group operations. However, depending on the representation of the group, the formula for the corresponding public key may appear different. For example, for a multiplicative group the formula is $q_M = \Pi (P_n)^{A_{mn}}$ where $\Pi$ indicates a product over the private key index n.

The above discussed concepts for the MMKMS are graphically shown in FIGS. 1 and 2. FIG. 1 shows a matrix 1 of a randomly generated finite set of master private postage meter keys $m_1$ to $m_n$ and a set of individual postage meter identifiers (such as the postage meter serial number) $M_1$ to $M_z$. The private key for each postage meter M is calculated, as shown in FIG. 2, to be the sum of the products $A_{My,x} \cdot m_x$ where X varies from 1 to n and y is a number between 1 to Z. The term $A_{My,x}$ is the coefficient value at the intersection of a particular row in the matrix 1 for a particular postage meter $M_y$ and the corresponding column for a particular master private key ($m_1$ to $m_n$). Thus, the private key $k_M$ for any particular postage meter ($M_1$ to $M_z$) is a linear combination of all of the master private postage meter keys $m_1$ to $m_n$ assuming none of the individual coefficients $A_{My,x}$ are equal to zero. However, in another embodiment some of the coefficients $A_{My,x}$ can be equal to zero such that the particular postage meter private key $k_M$ is a linear combination of at least two of the master private postage meter keys $m_1$ to $m_n$. By deriving the postage meter private keys $k_M$ based on a linear combination of at least two master private postage meter keys $m_1$ to $m_n$, the inventive MMKMS provides greater security than the proposed CPPS because the compromising of the private key $k_M$ of one postage meter does not result in the compromising of the security of a different postage meter.

As one possessing ordinary skill in the art will recognize, the level of security afforded by the MMKMS is based on the linear independence of the rows of coefficients of the matrix 1. While an entire matrix could be determined and generated for a finite set of master private postage meter keys and a set of postage meters such that the individual coefficient combinations in each row result in the desired row independence, it is more convenient and efficient to utilize algorithms to calculate the corresponding row coefficients associated with each individual postage meter $M_1$ to $M_z$ on an as needed basis. The calculation of the individual postage meter private keys is a fairly straightforward process and eliminates the need to store the entire matrix of coefficients.

The instant inventors have discovered that the provider can choose the coefficients of the matrix 1 to distribute linear combinations of a set of X master keys to a larger set of Y postage meters. For example, X may be 100 and Y may be 10,000. The coefficients of matrix 1 may be chosen so that an attacker must compromise the private keys of a set of S postage meters in order to obtain the private key for another postage meter. The design of the matrix 1 determines the value of S within the range $1 \leq S \leq X$. A goal of the key management system designer is to choose a matrix 1 with S sufficiently large to make attack by compromising postage meters impractical.

In one preferred embodiment, the designer chooses a prime number $X>1$, and generates X private keys $m_n$ where $0 \leq n \leq X-1$. The coefficient for any entry in the matrix 1 is $A_{M,n}=M^n$ (mod Order(P)), where M is an integer, such as the postage meter serial number, associated with a particular postage meter. If all M are less than Order(P), then this matrix has the property that any set of X rows are linear independent. The determinant of an X by X matrix formed from X rows of A is $|A|=\pm\Pi(M_a-M_b)$ (mod Order(P)), where the product $\Pi$ is over all pairs (a, b) of postage meters. If all the integers $M_a$ are different, then the determinant does not vanish. In other words, if an attacker learns up to X−1 private keys, she does not have sufficient information to discover any other key, because the combination of master keys for any other key is linearly independent.

In a second embodiment the designer chooses a prime integer X and generates 4·X master private keys. The master private keys are divided into four sets of X keys each and each set of master private keys are indexed by an integer n satisfying $0 \leq n \leq X-1$. The elements of the four sets of private keys are denoted $a_n$, $b_n$, $c_n$, and $d_n$. The provider calculates and publishes the set of master public keys $A_n=a_n \cdot P$, $B_n=b_n \cdot P$, $C_n=c_n \cdot P$, and $D_n=d_n \cdot P$.

Two integer key indices, i and j, are associated with each postage meter. This association could be random, or could preferably be derived based on some data such as postage meter number associated with the postage meter. As an example, for a postage meter with postage meter serial number M, i and j could be derived from M by an algorithm such as i=M mod X and j=floor (M/X) mod X, where floor(r) is the smallest integer less than or equal to r. The private key $k_{ij}$ for a postage meter with indices i and j is a linear combination including one private master key from each set of private master keys. A possible formula for the private key is $k_{ij}=a_i+b_{i+j \ (mod \ x)}+c_{i+2j \ (mod \ x)}+d_{i+3j \ (mod \ x)}$. The corresponding public key is a linear combination with the same coefficients: $Q_{ij}=A_i+B_{i+j \ (mod \ x)}+C_{i+2j \ (mod \ X)}+D_{i+3j \ (mod \ x)}$. In this embodiment, no two postage meters will have more than one master private key in common. An attacker must obtain the private keys of at least seven postage meters to find the private key for another postage meter. While this method requires the attacker to break fewer than the maximum possible number of keys, it has the advantage of allowing the verifier to construct a public key using only four master public keys. A further advantage is that the system degrades gracefully. Only certain specific postage meters are compromised when some small set of postage meters are compromised.

Several variations of the method discussed above increase the number of postage meter private keys the attacker must find in order to compromise the security of another postage meter. Modifying the coefficients of the linear combinations increases the difficulty of solving for the keys. For example, a combination of the previous methods gives $Q_{ij}=j \cdot A_i+j^2 \cdot B_{i+j(modX)}+j^3 \cdot C_{i+2j(modX)}+j^4 \cdot D_{i+3j(modX)}$. Another approach is to increase the number of sets of keys, such as by adding another set of X keys, and adding to each postage meter key a term proportional to $E_{i+4j \ (mod \ X)}$.

While the above discloses specific algorithms for defining the individual coefficients of matrix 1, the method can use other algorithms, or the matrix 1 can be a given matrix with elements given by a table and not derived from an algorithm.

Figure 3:
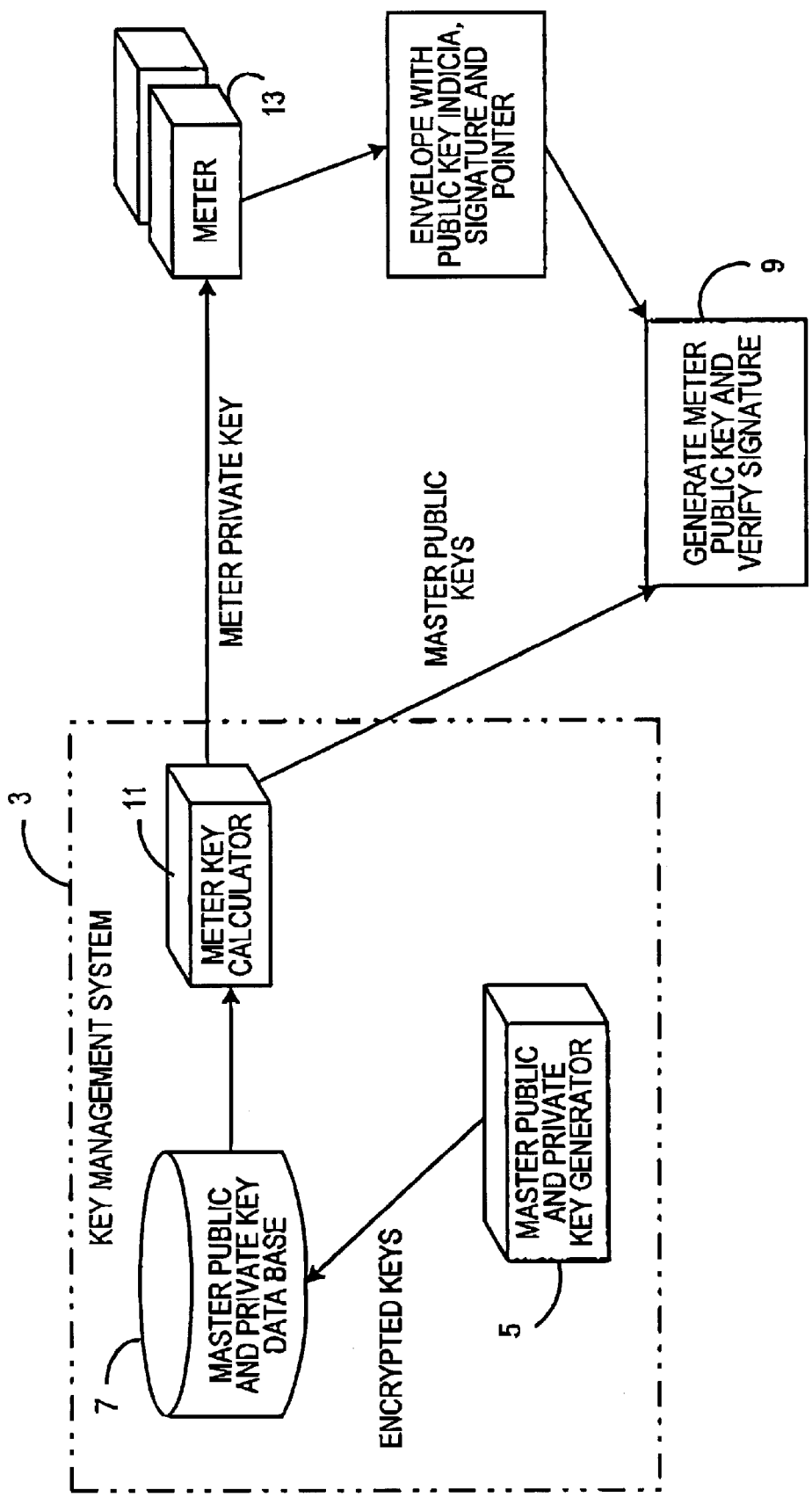
FIG. 3 schematically shows the relationships between the components of the inventive key generation, distribution, and indicia verification system.
Figure 4:
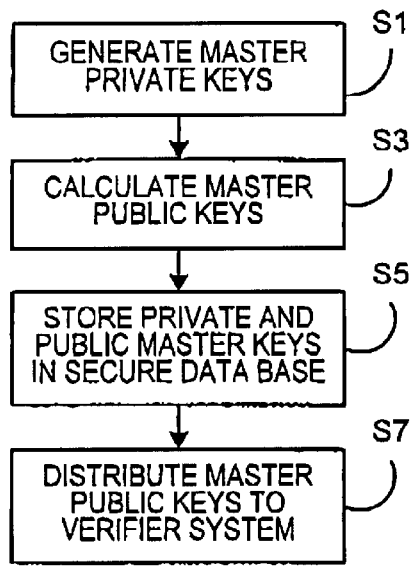
FIG. 4 is a flow chart for the process of generating and distributing keys.
Figure 5:
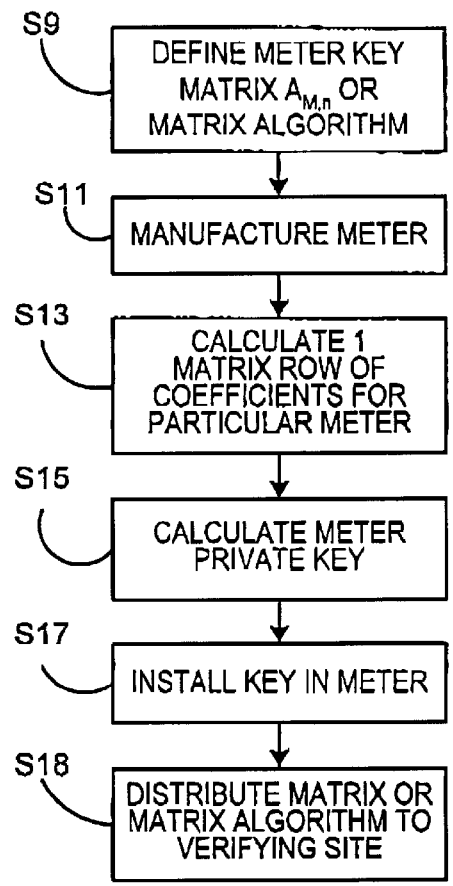
FIG. 5 is a flow chart showing the process of securely installing a postage meter private key in a postage meter.
Figure 6:
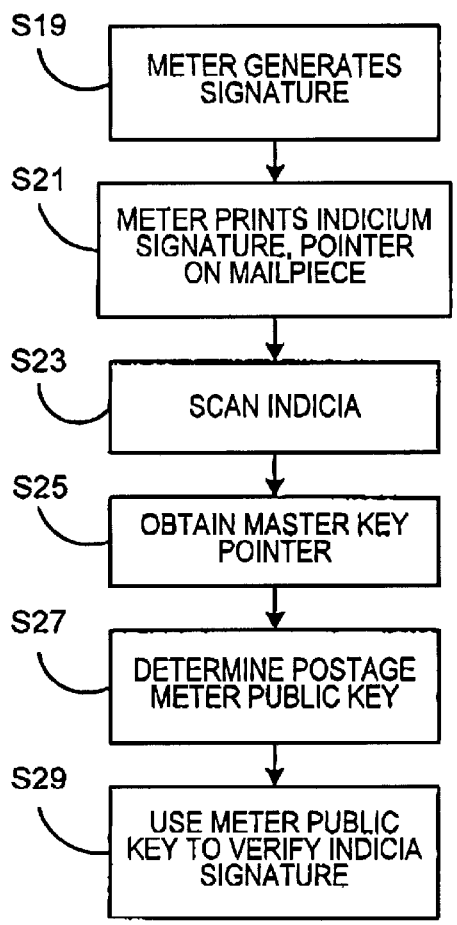
FIG. 6 is a flow chart showing the indicium verification process.

FIG. 3 shows the overall system for generating and distributing keys and for utilizing keys to verify a signature; all in the context of a postage metering environment. FIGS. 4, 5, and 6 respectively show the steps of the overall system in generating keys, distributing keys, and verifying printed indicium. All of the FIGS. 3–6 are referred to in connection with the following description of the overall system.

A key management facility 3 includes a key generation box 5 which preferably randomly generates a set of private master postage meter keys (step S1) and calculates a corresponding set of public master postage meter keys based on the private master postage meter keys (step S3). Both the generated private and public master postage meter keys are stored (step S5) in a secure data base 7. The public master postage meter keys are sent to individual verifying sites 9 which verify the postage indicium on mailpieces as is discussed in more detail below (step S7). Referring specifically to FIGS. 3 and 5, a postage meter key calculator 11 utilizes a meter key matrix or a matrix algorithm defined in accordance with the previously described instant invention (step S9) to determine for each manufactured meter 13 (step S11) the row of coefficients for that particular meter 13 (step S13). The row of coefficients are then used to calculate a private key for the particular meter 13 utilizing a linear combination of at least more than one of the public master postage meter keys (step S15). The calculated private postage meter key for a particular postage meter 13 is then stored within the postage meter 13 (step S17). The key matrix or matrix algorithm is also provided to the verifying sites 9 for subsequent use in generating the postage meter public keys as discussed below (step S18).

Referring to FIGS. 3 and 6, the postage meter 13, when performing a postage transaction, generates a unique signature utilizing the stored private postage meter key for each postage indicium created by the postage meter (step S19).

The unique signature is printed as part of the indicium together with a pointer on individual mailpieces 15 (step S21). When the mailpiece is subsequently processed at the verifying site 9, the indicium, pointer and signature are scanned in a conventional manner (step S23). The verifying site utilizes the obtained pointer (step S25) to look up from a table or alternatively calculate using the pointer and the public master postage meter keys a postage meter public key (step 27) for the postage meter 13 that produced the indicium. At step S29, the verifying site utilizes the postage meter public key in a conventional manner to verify the signature on the mailpiece.

The pointer discussed above permits the determination of the specific row of coefficients for a particular meter so that the postage meter public key can be derived based on the row of coefficients and the master set of public keys. In one preferred embodiment the pointer could be the postage meter serial number. Alternatively, the pointer could be different data associated with each individual meter which permits rekeying of the postage meter without requiring a serial number change.

Furthermore, in the descriptions set forth above as well as that set forth in the claims, when the discussion of the generation of a matrix of coefficients is utilized, the invention is not restricted to actually producing the entire matrix. Rather, via the use of algorithms any specific matrix row or non-zero elements of a matrix row can be calculated on an as desired basis and the invention is intended to cover such real time individual matrix row generation.

It is further to be understood that with reference to FIG. 3, the exchange of information between modules and the operations performed by individual modules are respectively accomplished via standard communications hardware/software and microprocessors/software such that a detailed description of such components has not been set forth.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims.

What is claimed is:

1. A method for assigning keys to a plurality of devices in a public key cryptographic system, the method comprising the steps of:
    a) generating a set of more than one master private keys;
    b) calculating for each master private key a corresponding master public key;
    c) installing in each of the plurality of devices a corresponding device private key derived as a linear combination of at least two of the master private keys from the set of master private keys whereby knowledge of the corresponding device private key installed in any one of the plurality of devices is not sufficient to determine the corresponding device private key of any other of the plurality of devices and wherein each of the plurality of devices uses its corresponding device private key to generate a signature.

2. A method as recited in claim 1 further comprising the steps of generating a set of more than one master public keys based on the set of more than one master private keys and calculating a device public key for each of the plurality of devices based on a combination of the master public keys.

3. A method as recited in claim 1, further comprising the steps of
    utilizing an algorithm to generate a matrix of coefficients, wherein each of the coefficients is associated with one of the master private keys and one of the plurality of devices and each of the plurality of devices has a row of coefficients associated therewith;
    deriving the corresponding device private key for any particular one of the plurality of devices by utilizing the row of coefficients for the any particular one of the plurality of devices to determine the linear combination of master private keys for the any particular one of the plurality of devices.

4. A method as recited in claim 3, wherein the algorithm utilized to generate the matrix of coefficients is such that a number of the plurality of devices corresponding secure device private keys that need to be compromised to compromise the security of at least one other of the plurality of devices is equal to a total number of the master private keys.

5. A method as recited in claim 3, wherein the algorithm utilized to generate the matrix of coefficients is such that a predetermined number of the corresponding device private keys less than a total number of master private keys but greater than one are needed to compromise the security of at least one other of the plurality of devices.

6. A method as recited in claim 3, wherein the algorithm utilized to generate the matrix of coefficients utilizes data which identifies a specific one of the plurality of devices.

7. A method as recited in claim 6, wherein the data is a serial number associated with the specific one of the plurality of devices.

8. A method as recited in claim 6, wherein the data is a special key identifier which is different from a serial number associated with a specific one of the plurality of devices.

9. A method as recited in claim 3, wherein each row of coefficients of the matrix has at most N non-zero coefficients where N is less than a total number of master private keys but greater than 1.

10. A method as recited in claim 3, wherein a total number of the master private keys is divided into separate sets of master private keys and the algorithm is such that the row of coefficients for the any particular one of the plurality of devices only has one non-zero coefficient associated with each of the separate sets of master private keys such that the corresponding device private key for the any particular one of the plurality of devices is derived based on a linear combination of one private master key from each of the separate sets of master keys.

11. A method as recited in claim 10, wherein the number of sets of master private keys is 4.

12. A method as recited in claim 3 wherein all of the coefficients are either 1 or 0.

13. A method as recited in claim 1, wherein the plurality of devices are postage meters.

* * * * *